United States Patent
Stroeml et al.

[11] Patent Number: 5,958,130
[45] Date of Patent: Sep. 28, 1999

[54] BIOLOGICAL FIBER CONTAINING CONSTRUCTION COMPOUND

[75] Inventors: Karl F. Stroeml, Wall Str. 36, A-8280 Fuerstenfeld; Gerhard Uiberlacker, Oehling, both of Austria

[73] Assignee: Karl F. Stroeml, Fuerstenfeld, Austria

[21] Appl. No.: 08/946,722

[22] Filed: Oct. 8, 1997

[30] Foreign Application Priority Data

Oct. 9, 1996 [AU] Australia .................. GM 591/96

[51] Int. Cl.⁶ .................................................. C04B 16/06
[52] U.S. Cl. ................................. 106/653; 106/731
[58] Field of Search ................................. 106/653, 731

[56] References Cited

U.S. PATENT DOCUMENTS 4,132,555 1/1979 Barrable .................. 106/731

FOREIGN PATENT DOCUMENTS

| | | |
|---|---|---|
| 888971 | 9/1981 | Belgium . |
| 1071907 | 5/1993 | China . |
| 1095698 | 11/1994 | China . |
| 263349 | 3/1990 | Czech Rep. . |
| 149881 | 10/1986 | Denmark . |
| 2727675 | 6/1996 | France . |
| 3005288 | 9/1980 | Germany . |
| 3015734 | 11/1980 | Germany . |
| 55-162468 | 12/1980 | Japan . |
| 55-162472 | 12/1980 | Japan . |
| 62-246880 | 10/1987 | Japan . |
| 04065335 | 3/1992 | Japan . |
| 06263504 | 9/1994 | Japan . |

OTHER PUBLICATIONS

"Use of Flax Shives as Filler in Structural Materials", Yumashev et al., Tek St. Pro–St. (Moscow), (2), p. 37–38, 1986. (see abstract).

*Primary Examiner*—Paul Marcantoni
*Attorney, Agent, or Firm*—Karl Hormann

[57] ABSTRACT

A construction compound of the kind including a hydraulic binder such as cement and natural bast fibers of a length of between 1 and 50 mm in a concentration of from about 0.3 to about 3.0 kg of fibers per cubic meter of compound, said fibers being derived from fully ripened plants including hemp, flax, kenaf and nettle.

16 Claims, 14 Drawing Sheets

Table 1: Composition of Mixture

|  | Mixture 1 Blind Mortar no Fiber Added | | Mixture 2 Natural Fiber (Hemp) Length of Fiber: 6 mm | | Mixture 3 Natural Fiber (Hemp) Length of Fiber: 6 mm | | Mixture 4 Polypropylene Length of Fiber: 12 mm | |
|---|---|---|---|---|---|---|---|---|
|  | per Lot | kg/m³ | per Lot | kg/m³ | per Lot | kg/m³ | per Lot | kg/m³ |
| Addition 0/4 Moist | 81 kg | 1407 | 81 kg | 1412 | 81 kg | 1451 | 81 kg | 1399 |
| Cement CMZ 275 | 4 kg | 69 | 4 kg | 70 | 4 kg | 72 | 4 kg | 69 |
| EIBERGIT Spezial | 12 kg | 208 | 12 kg | 209 | 12 kg | 215 | 12 kg | 207 |
| Fiber | --- | --- | 58 g | 1.01 | 174 g | 3.12 | 58 g | 1.00 |
| Water | 13 kg | 226 | 13 kg | 227 | 13 kg | 233 | 13 kg | 225 |
| Total Quantity | 110 kg | 1910 | 110 kg | 1917 | 110 kg | 1970 | 110 kg | 1900 |

Table 2: Characteristics of Fresh Mortar

|  | Mixture 1<br>Blind Mortar<br>no Fiber Added | Mixture 2<br>Natural Fiber (Hemp)<br>Length of Fiber: 6 mm | Mixture 3<br>Natural Fiber (Hemp)<br>Length of Fiber: 6 mm | Mixture 4<br>Polypropylene<br>Length of Fiber: 12 mm |
|---|---|---|---|---|
|  |  | 1 kg/m$^3$ | 3 kg/m$^3$ | 1 kg/m$^3$ |
| Spreading Dimension | 18.4 cm | 19.0 cm | 18.8 cm | 17.8 cm |
| Air Pores | 12.4 % | 12.0 % | 9.9 % | 13.0 % |
| Fresh Mortar Raw Density | 1,910 kg/m$^3$ | 1,917 kg/m$^3$ | 1,977 kg/m$^3$ | 1,900 kg/m$^3$ |
| Air Temp./Mortar Temp. | 8° C / 7° C | 8° C / 7° C | 8° C / 7° C | 8° C / 7° C |
| Processability | Very good | Very goood | Very good | Very good |
| Water/Binder Value | about 1.0 | about 1.0 | about 1.0 | about 1.0 |

Table 3: Change in Strength in % Relative to Blind Mortar

| | Mixture 2<br>Natural Fiber (Hemp)<br>Length of Fiber: 6 mm | Mixture 3<br>Natural Fiber (Hemp)<br>Length of Fiber: 6 mm | Mixture 4<br>Polypropylene<br>Length of Fiber: 12 mm |
|---|---|---|---|
| | 1 kg/m³ | 3 kg/m³ | 1 kg/m³ |
| | Development of Tensile Bending | | Strength |
| Test Age | | | |
| 7 days | + 1.0 % | + 38.4 % | + 22.2 % |
| 32 days | + 7.8 % | + 60.9 % | + 27.8 % |
| 56 days | + 9.6 % | + 64.3 % | + 36.5 % |
| | Development of Compression | | Strength |
| Test Age | | | |
| 7 days | + 3.0 % | + 46.8 % | + 23.6 % |
| 32 days | + 15.9 % | + 52.1 % | + 25.8 % |
| 56 days | +7.1 % | + 89.8 % | + 16.1 % |

Table 4: Tensile Bending Strength to Pressure Ratio

| | Mixture 1<br>Blind Mortar<br>no Fiber Added | Mixture 2<br>Natural Fiber (Hemp)<br>Length of Fiber: 6 mm | Mixture 3<br>Natural Fiber (Hemp)<br>Length of Fiber: 6 mm | Mixture 4<br>Polypropylene<br>Length of Fiber: 12 mm |
|---|---|---|---|---|
| | | $1 \text{ kg/m}^3$ | $3 \text{ kg/m}^3$ | $1 \text{ kg/m}^3$ |
| | Tensile Bending Strength to Pressure Ratio | | | |
| Test Age | | | | |
| 7 days | 1 : 2.70 | 1 : 2.75 | 1 : 2.86 | 1 : 2.73 |
| 32 days | 1 : 3.50 | 1 : 3.77 | 1 : 3.31 | 1 : 3.45 |
| 56 days | 1 : 2.81 | 1 : 2.75 | 1 : 3.24 | 1 : 2.39 |

Table 5: Composition of Mixture

|  | Mixture 1<br>Blind Mortar<br>no Fiber Added | | Mixture 2<br>Natural Fiber (Hemp)<br>Length of Fiber: 6 mm | | Mixture 3<br>Natural Fiber (Hemp)<br>Length of Fiber: 6 mm | | Mixture 4<br>Polypropylene<br>Length of Fiber: 12 mm | |
|---|---|---|---|---|---|---|---|---|
|  | per Lot | kg/m³ | per Lot | kg/m³ | per Lot | kg/m³ | per Lot | kg/m³ |
| Addition 0/4 moist | 79 kg | 1711 | 79 kg | 1729 | 79 kg | 1719 | 79 kg | 1715 |
| Cement CMZ 275 | 16 kg | 346 | 16 kg | 350 | 16 kg | 348 | 16 kg | 347 |
| Fiber | --- | --- | 47 g | 1.03 | 140 g | 3.05 | 47 g | 1.02 |
| Water | 11 kg | 232 | 11 kg | 234 | 11 kg | 233 | 11 kg | 232 |
| Total Quantity | 106 kg | 2289 | 106 kg | 234 | 106 kg | 2303 | 106 kg | 2295 |

Table 6: Characteristics of Fresh Mortar

|  | Mixture 1<br>Blind Mortar<br>no Fiber Added | Mixture 2<br>Natural Fiber (Hemp)<br>Length of Fiber: 6 mm | Mixture 3<br>Natural Fiber (Hemp)<br>Length of Fiber: 6 mm | Mixture 4<br>Polypropylene<br>Length of Fiber: 12 mm |
|---|---|---|---|---|
|  |  | 1 kg/m$^3$ | 3 kg/m$^3$ | 1 kg/m$^3$ |
| Spreading Dimension | 15.5 cm | 15.9 cm | 16.0 cm | 15.4 cm |
| Air Pore Content | 4.1 % | 2.6 % | 3.2 % | 3.8 % |
| Fresh Mortar Raw Density | 2,289 kg/m$^3$ | 2,314 kg/m$^3$ | 2,303 kg/m$^3$ | 2,295 kg/m$^3$ |
| Air Temp./Mortar Temp. | 8° C | 6° C | 8° C | 6° C | 8° C | 6° C | 8§ C | 6° C |
| Processability | Very good | Very good | Very good | Very good |
| Water/Binder Value | about .7 | about .7 | about .7 | about .7 |

Table 7: % Change in Strength Relative to Blind Mortar

|  | Mixture 2<br>Natural Fiber (Hemp)<br>Length of Fiber: 6 mm<br>1 kg/m³ | Mixture 2<br>Natural Fiber (Hemp)<br>Length of Fiber: 6 mm<br>3 kg/m³ | Mixture 4<br>Polypropylene<br>Length of Fiber: 12 mm<br>1 kg/m³ |
|---|---|---|---|
| Test Age | Development of Tensile Bending | Tensile Bending | Strength |
| 7 days | + 22.9 % | + 12.7 % | + 3.2 % |
| 32 days | + 24.9 % |  | + 15.8 % |
| 55 days | - 3.0 % | 17.2 % | 7.4 % |
| Test Age | Development of Compression | Compression | Strength |
| 7 days | + 30.4 % | +3.6 % | + 12.5 % |
| 32 days | + 22.9 % | + 10.4 % | + 10.4 % |
| 55 days | - 2.1 % | - 2.7 % | -5.2 % |

Table 8: Tensile Bending Strength to Pressure Ratio

| | Mixture 1<br>Blind Mortar<br>no Fiber Added | Mixture 2<br>Natural Fiber (Hemp)<br>Length of Fiber: 6 mm | Mixture 3<br>Natural Fiber (Hemp)<br>Length of Fiber: 6 mm | Mixture 4<br>Polypropylene<br>Length of Fiber: 12 mm |
|---|---|---|---|---|
| | | 1 kg/m³ | 3 kg/m³ | 1 kg/m³ |
| Test Age | Tensile Bending Strength to Pressure Ratio | | | |
| 7 days | 1 : 5.26 | 1 : 5.58 | 1 : 4.83 | 1 : 5.73 |
| 32 days | 1 : 5.81 | 1 : 5.72 | | 1 : 5.54 |
| 55 days | 1 : 6.14 | 1 : 6.20 | 1 : 5.12 | 1 : 5.36 |

BIOLOGICAL FIBER CONTAINING CONSTRUCTION COMPOUND

BACKGROUND OF THE INVENTION

1. Field of the Invention

The invention, in general, relates to construction compounds containing a biological fiber and, more particularly, to a compound of the kind conventionally supplied as a dry powder, prepared and applied as a slurry before drying or curing to a hard, stone-like state. While the invention will hereinafter be primarily described in connection with cement, mortar and concrete, it will be understood by those skilled in the art that it is equally useful in connection with such substances as gypsum and plaster of paris or, indeed, organic adhesives and the like.

2. Background of the Invention

In the construction trade it is common practice to reinforce construction compounds such as, for example, mortar, concrete or screed by the addition of artificial or synthetic fibers such as polypropylene. Such additives have been found in certain circumstances to enhance the physical properties of the construction compounds. They may, for instance, result in increased load-bearing and strain-resisting properties of constructed components or surfaces. In Europe, about 10,000 tons of synthetic fibers are used annually as reinforcement for concrete, mortar and screed mixtures. Structures and surfaces made from concrete, mortar or screed without the fiber additives tend to develop cracks from shrinkage or condensation. They are neither durable nor do they tolerate heavy loads.

Disadvantages inherent in the use of chemically produced fibers as reinforcement for concrete and the like are that they are relatively expensive, they are derived from finite raw materials, and they are a burden on the ecology. Moreover, it is difficult to process them in connection with construction compounds of the kind here under consideration. For proper mixing they require complex mixing equipment such as horizontal pan mixers. Experiments conducted by the inventors have shown that adding such fibers to concrete slurries and the like in ordinary tumble mixers results in the formation of lumps. Such lumps detrimentally affect the homogeneity of the mixture as well as the properties of the finished product. The load-bearing properties of components and surfaces made from concrete incorporating such lumped fibers are reduced significantly.

Aside from the use of synthetic fibers, it has also been known to utilize natural fibers for improving the characteristics of artificial stones or masonry. For instance, German patent 298,332 discloses a method of making artificial masonry compounds utilizing jute fibers mixed to a homogenous mass with a hydraulic binder and water. The compound is thereafter formed into a desired shape by stamping or compacting with alternate net-like layers of jute fiber webs.

German Patent specification 3,902,595 proposes the manufacture of construction boards from hydraulic binders as fillers, using cellulose derivatives such as cellulose acetate and the like aside from organic fibers such as wood pulp, paper, flax, hemp, jute. In order to provide for permanent strength of the boards and thus to improve their useful life, the proportion of water soluble sodium, i.e., sodium monoxide ($Na_2O$) is reduced to less than 10 mg/10 g of solids. The proportion of water soluble potassium, i.e. potassium oxide ($K_2O$) is below 15 mg/10 g of solids. Hence, damage to cellulose fibers from alkaline substances is substantially avoided.

WO 96/25370 A1 relates to a wall plastering compound mixed with natural fibers, for interior and exterior walls. The natural fibers used are hemp or bombax fiber prepared by a degumming process. Large scale production of this building material is not possible, however, since at present degumming or cottonizing of hemp is technically feasable on a laboratory scale only. There are no indications that hemp cottonzing plants are even in their planning stages. Moreover, it is questionable whether sufficient quantities of hemp fibers harvested in the manner described in WO 96/25370 are available. They are harvested at a time at which the blossoms are at the beginning stage of pollenization. That is to say their seeds have not yet ripened, which in some parts of the world, as in the European Union, may be considered to be a deterrent to commercialization as such plants are not subject to government subsidies. Hence, there is only a small, if any, incentive to plant hemp or other textile plants of properties similarly useful in the context of the present invention.

OBJECTS OF THE INVENTION

It is a primary object of the invention to provide an economical construction compound, such as, cement, mortar, screed or plaster of paris of superior qualities.

It is a more particular object of the invention to provide a building material of the kind under consideration which exhibits higher tensile bending strength, compression strength and tensile strength.

Yet another object of the invention is to provide a building compound of the kind under consideration which provides for a reduced formation of condensation water.

Another object of the invention is to provide a building compound including organic fibers and which may be easily processed.

Still another object of the invention is to provide an incentive to use naturally grown and replenishable substances as additives in conventional construction compounds such as cement and plaster of paris.

BRIEF SUMMARY OF THE INVENTION

In the accomplishment of these and other objects, the invention, in a currently preferred embodiment thereof, provides for a compound useful for concrete, mortar, plaster and screed including natural fibers, such as fully ripened and water-retted or decorticated bast fibers having a length from about 1 to about 50 mm, preferably about 5 to about 30 mm with a concentration of from about 0.3 to about 3.0 kg/m$^3$ building compound. The bast fibers are preferably from the group including hemp, flax, nettle and kenaf or ambari fibers.

BRIEF SUMMARY OF THE SEVERAL DRAWINGS AND TABLES

The novel features which are considered to be characteristic of the invention are set forth with particularity in the appended claims. The invention itself, however, in respect of its structure, construction, lay-out and design, as well as manufacturing techniques, together with other objects and advantages thereof will be best understood from the description of the preferred embodiment, when read in conjunction with the appended drawings and tables, in which:

Figure 1:
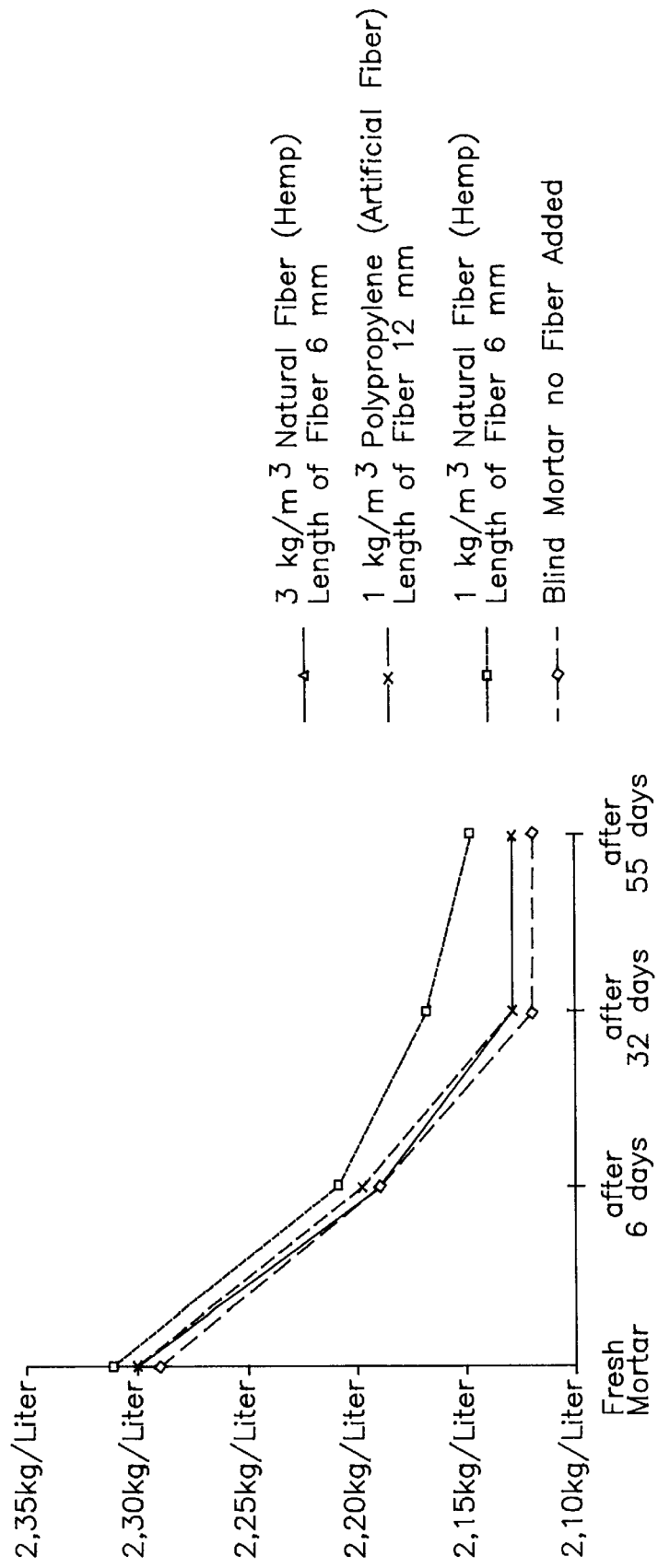
FIG. 1 is diagrammatic presentation of comparative values of changes in the specific gravity of screed compounds incorporating natural fibers in accordance with the invention, no fibers, and synthetic fibers.

Table 1 is a list of representative building compounds with and without natural and synthetic fibers, respectively;

Table 2 is a list of characteristic values of fresh mortar compounds;

Table 3 is a presentation of the change in strength, measured in per cent, relative to mortar not containing fibres;

Table 4 is a presentation of the ratio between tensile bending strength and pressure; and Table 5–8 are presentation similar to those of Tables 1–4 based on compounds of a different composition.

DETAILED DESCRIPTION OF THE PREFERRED EMBODIMENTS

A building compound and, more particularly, contrete, mortar, screed and wall plaster including natural fibers is preferrably provided with about 0.3 to about 3.0 kg fibers per cubic meter of compound, the fibers being preferrably fully ripened and cooked bast fibers of a length between about 1 to about 50 mm and preferrably between about 5 to about 30 mm. Such compositions have been found to ensure ease of incorporating and uniform distribution of the natural fibers within the building compound which, in turn, lead to higher tensile bending, compression and tensile strengths in finished concrete, mortar and screed components or surfaces. Moreover, incorporation of the bast fibers in the building compounds leads to a significant reduction of condensation water as well as cracks otherwise resulting from shrinkage. The use of mechanically processed bast fibers leads to an extremely economical processing of the fibers. This, in turn, leads to reduced prices for the building compounds as well as components made therefrom. Complex and expensive cottonization or degumming of the fibers can be dispensed with. Since the fibers, i.e. their plants, are harvested after their seeds have ripened, they may well provide an incentive to farmers to grow them and an important impetus for their agricultural cultivation, at least in those parts of the world, as in the European Union, where governments pay subsidies for such crops. These fiber crops may thus contribute to replacing synthetic substances by naturally grown ones. Adding such fibers to the construction compounds under consideration results in reducing their cement contents and, therefore, their commercial and ecological manufacturing costs. While the fibers of the primary examples herein discussed and referred to in the appended drawings and tables are hemp, it is to be understood that bast fibers as flax, kenaf (or ambari) and nettles are similarly useful as additives in construction compounds in accordance with the invention.

Further cost reductions without significantly affecting the quality and strength of the construction compounds may be achieved by adding about 2 to about 3 kg of fibers of a length between about 6 and about 15 mm to each cubic meter of solids. The inventors have found that the bast fibers may include up to 30% of shives or hurds without affecting the quality of the construction compound in any significant way.

Preferably, the bast fibers are added to a hydraulic binder material, such as cement.

The bast fibers to be added to construction compounds, in particular concrete, mortar, screed and wall plaster are harvested no sooner than when the seeds of their plants have ripened, and they are mixed into the compound after having been water-retted. The construction compound mixtures may be easily prepared, for the fibers may be added to, and uniformly distributed in, the compound, in a simple and conventional tumble mixer without forming lumps and the like. The uniform distribution of the fibers within the compound ensures a final product of uniform consistency and optimum material characteristics.

While conventional tumble mixers are the currently preferred apparatus for mixing solids and fibers to a uniform or homogenous mixture, horizontal pan mixers, while significantly more expensive, are no less suitable for mixing the materials. Further economies may be obtained by preparing the compound mixture at a construction site.

Particular properties, details and advantages of the invention have been listed in the appended tables and are depicted in the graphs of the Figures.

To produce a wall plaster, an initial mixture of two thirds of the mixing water and a desired additive is prepared in a tumble mixer. Thereafter, a mortar binder and the requisite amount of cement are added and thoroughly mixed. 6 mm long hemp fibers are then added to and thoroughly mixed into the composition. A first lot (mixture 2) thereof is mixed at a rate of 1 kg per cubic meter of mixture. Another lot (mixture 3) is prepared with the same kind of hemp fibers at a rate of 3 kg per cubic meter of basic mixture. For comparison, a further lot (mixture 4) was prepared with polypropylene fibers of a length of with 12 mm and concentration of 1 kg/m$^3$ instead of hemp fibers. In adding the polypropylene fibers to the basic mixture it was discovered that even after prolonged mixing in a tumble mixer it was not possible to eliminate lumps of the fibers. The lumps prevented an even distribution of the fibers within the mortar mixture. Another lot (mixture 1), sometime referred to herein as "blind mortar", was prepared without adding any fibers. Details of the composition have been noted in Table 1. The remaining one third of the water was used to adjust the consistency of the compound to allow optimum processing and working.

The four different mixtures were utilized under identical conditions, and their characteristics have been noted in Table 2.

Thereafter the wall plaster mixtures were examined in respect of their tensile bending and compression strength and compared to the values of the blind mortar (mixture 1). The results have been noted in Table 3. As will be clearly seen, those wall plasters containung a concentration of 3 kg/m$^3$ of 6 mm long hemp fibers are noticeably stronger than wall plaster without the reinforcement fibers.

Table 4 displays the tensile bending to pressure ratios of the examined mixtures. To avoid the formation of cracks the tensile bending to pressure ratio of a plaster or mortar mixture should not be less than 1:3.5.

Cement is also added for the production of screed. Both initial ingredients are thoroughly mixed with water in a tumble mixer. Thereafter, two mixtures, one containing hemp fibers and a comparative mixture containing polypropylene fibers are prepared. The exact composition of the mixtures as well as the proportions of hemp and polypropylene fibers in their respective mixtures has been noted in Table 5.

After adjusting them to an optimum consistency, the four mixtures are processed under identical conditions. The characteristics of the fresh mortars are noted in Table 6.

These screed mixtures containing the fibers were also subjected to tensile bending and compression strength tests and compared to the values of the blind mortar. The results of the comparison are note in Table 7. It will be seen that the strength of the flooring concrete including 6 mm long hemp fibers at a concentration of 3 kgm³ is significantly improved over the compound containing no fibers.

Table 8 depicts the tensile bending to pressure ratios of the examined flooring concrete mixtures.

Figure 2:
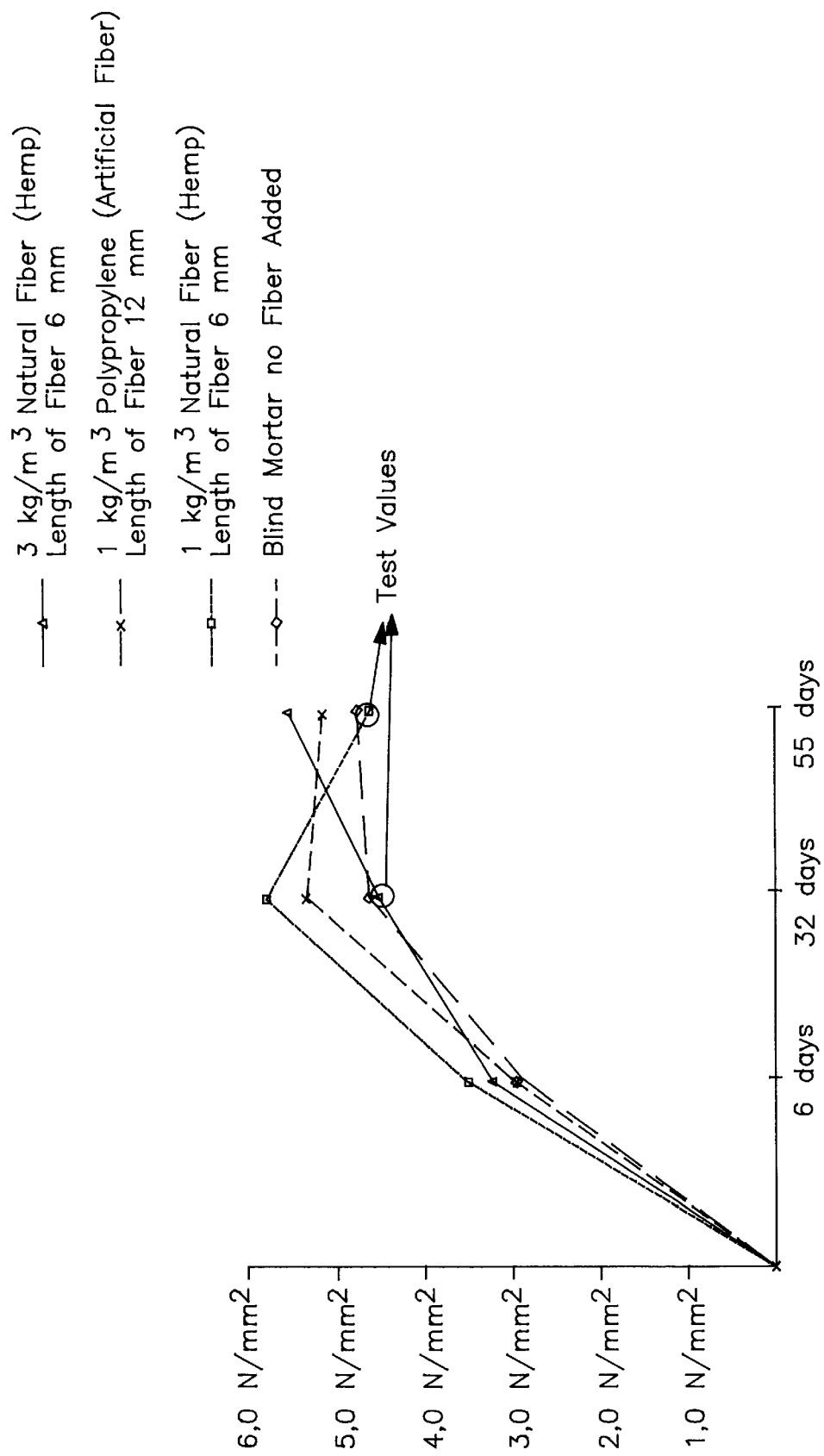
FIG. 2 is a diagrammatic presentation similar to FIG. 1 but depicting the development of tensile bending strength.
Figure 3:
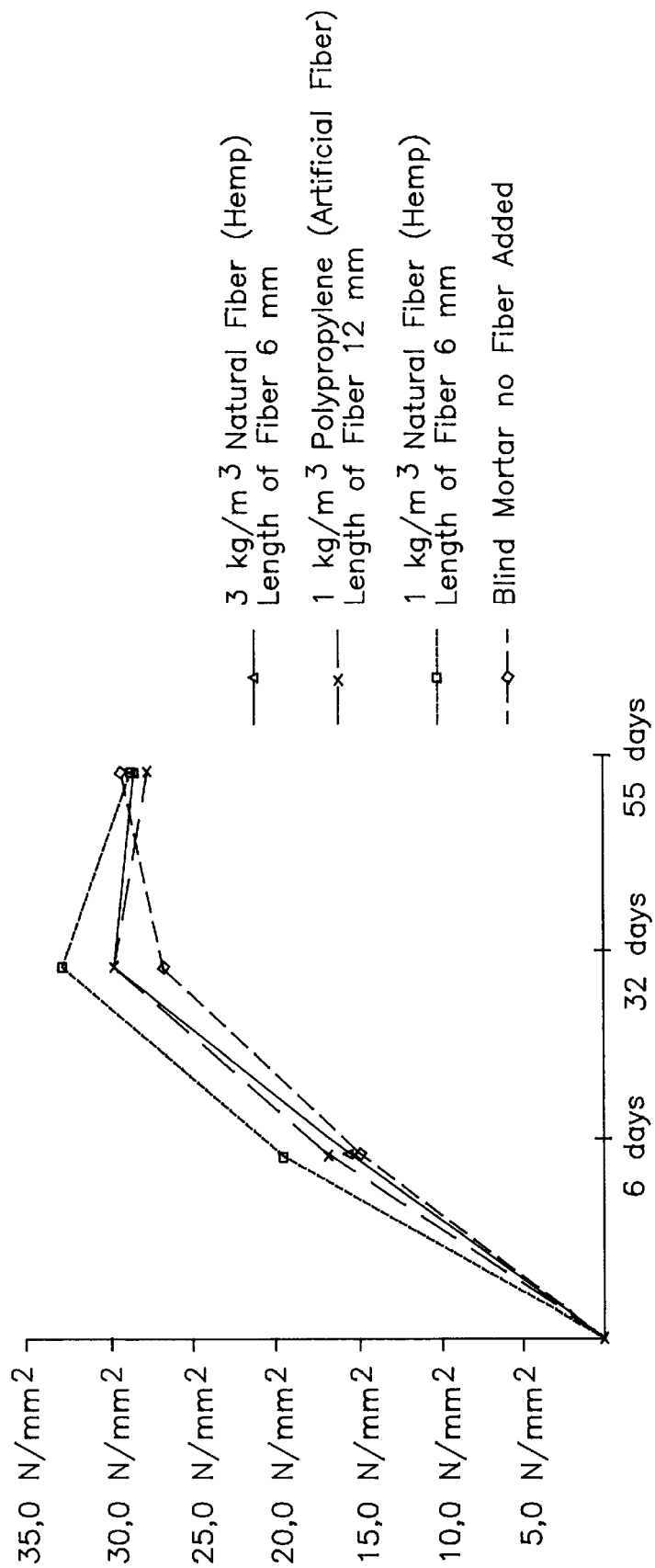
FIG. 3 is a diagrammatic representation similar to FIG. 2 but depicting the developement of compression strength.
Figure 4:
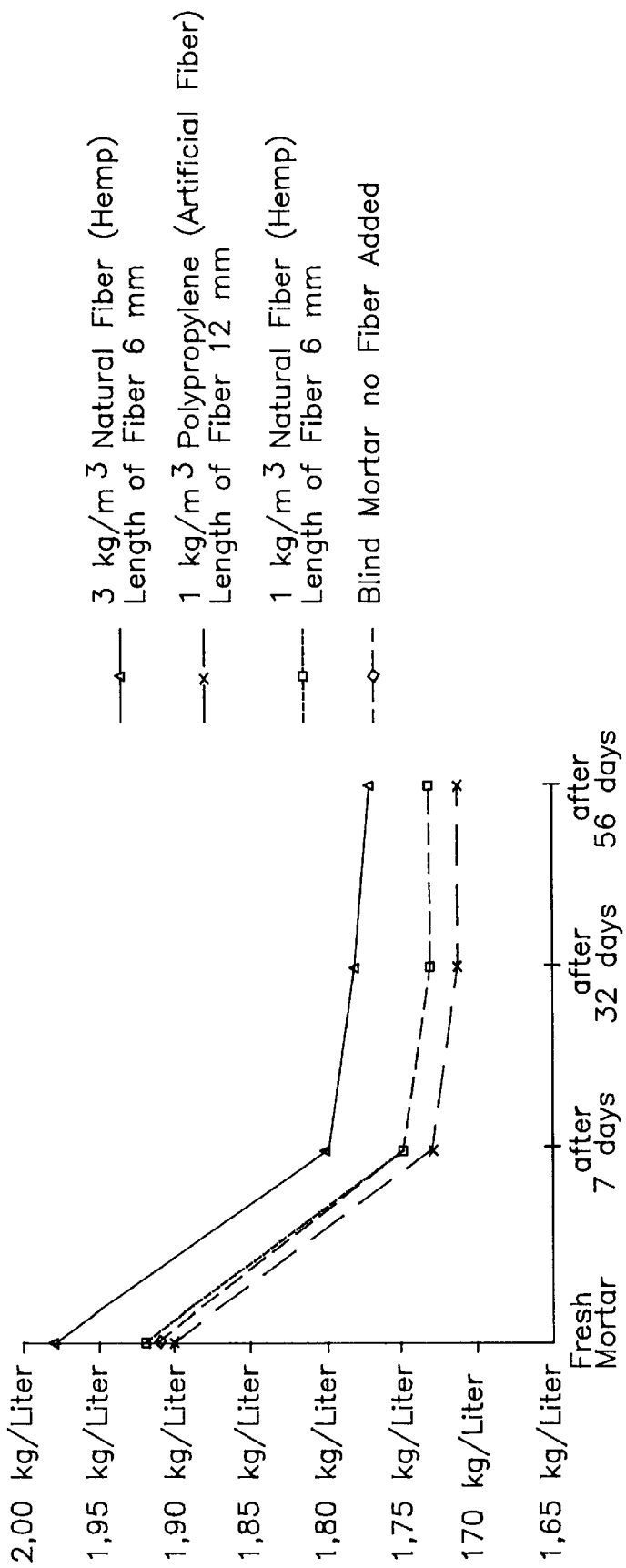
FIGS. 4–6 are diagrammatic presentation similar to FIGS. 1–3 but relating to wall plaster, instead.
Figure 5:
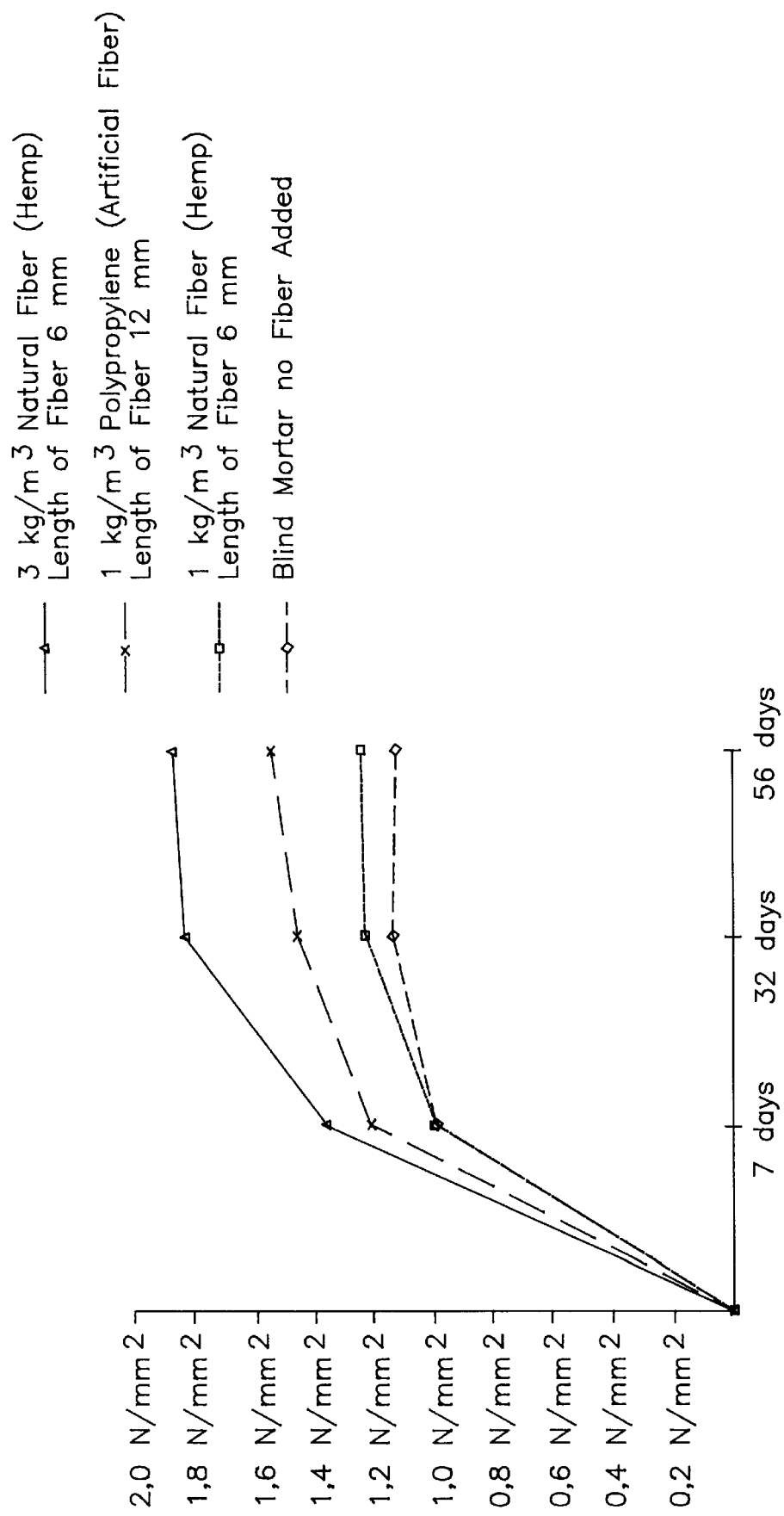
Figure 6:
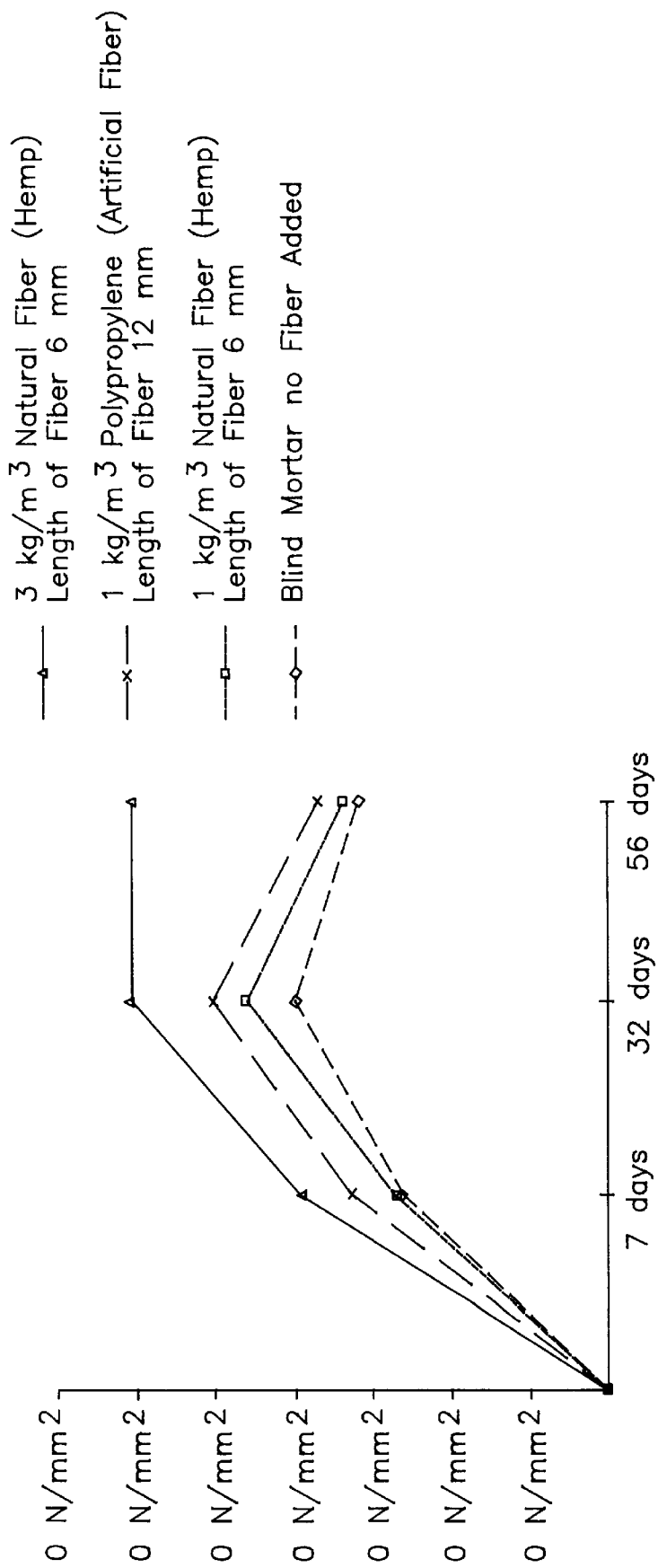

Finally, FIGS. 1–6 depict the development over time of changes in the specific gravity (FIGS. 1 and 4), tensile bending strength (FIGS. 2 and 5) and compression strength (FIGS. 3 and 6) of screed. The figures make it plain that the construction compounds in accordance with the invention possess significantly favorable properties.

It will be appreciated by those skilled in the art that the invention is not limited to the examples and embodiments described. Instead, the invention may be practiced, under the umbrella of the appended claims, in many different ways and fields. Thus, it may be advantages in certain circumstances to utilize bast fibers of different lengths within the values set forth, such as 5, 10 and 15 mm, and at predetermined relative concentrations. In addition to using natural fibers of different lengths, it may also be advantageous to add different fibers to the construction compounds. Mixtures of natural and synthetic fibers may in some circumstances prove to be advantageous.

Natural fibers such as those of hemp, flax, kenaf or nettles may be mixed with hydraulic binders or with mixtures of concrete, mortar, wall plaster and screed to improve the tensile bending and compression strengths thereof. Preferably, the fibers are derived from fully ripened and water-retted bast fibers cut to lengths from about 1 to about 50 mm, but preferrably between 5 and 30 mm, and they are used in concentration of from about 0.3 to about 3.0 kg/m³. It will be understood that the fibers may be contained in so-called ready-mix cement, or they may be added at a construction site to suit individual requirements.

It will also be appreciated that characteristics and advantages to be derived from the instant description and claims, including methodological details and steps may individually or in any combination be significant to the invention.

What is claimed is:

1. A construction compound including a hydraulic binder, comprising:

water-retted bast fibers derived from plants and having a length of between about 1 mm and about 50 mm, in a concentration of between about 0.3 kg and about 3.0 kg of fiber per cubic meter of compound.

2. The compound of claim 1, wherein said bast fibers are selected from the group consisting of hemp, flax, kenaf and nettle.

3. The compound of claim 2, wherein said fibers are of a length of from about 6 to about 15 mm.

4. The compound of claim 3, wherein said fibers are present in the compound at a concentration of from about 2 to about 3 kg per cubic meter of compound.

5. The compound of claim 1, wherein said fibers contain up to 30% of shives.

6. The compound of claim 1, wherein said hydraulic binder is cement.

7. The compound of claim 1, wherein said compound is selected from the group consisting of concrete, mortar, screed and wall plaster.

8. The method of making a construction compound including the steps of:

harvesting plants containing bast fibers;

water-retting said plants to derive said bast fibers therefrom; and mixing said bast fibers into a hydraulic binder.

9. The method of claim 8, further including the step of cutting said fibers to a length of from about 1 to about 50 mm.

10. The method of claim 9, wherein said fibers are cut to a length from about 6 to about 30 mm.

11. The method of claim 10, wherein said fibers are mixed into a ready-made basic construction compound selected from the group consisting of concrete, mortar, screed and wall plaster.

12. The method of claim 11, wherein said basic compound contains a hydraulic binder.

13. The method of claim 12, wherein said hydraulic binder is cement.

14. The method of claim 13, wherein said fibers are mixed with said basic compound in a tumble mixer for a time sufficient to avoid the formation of lumps of said fibers.

15. The method of claim 13, wherein said fibers are mixed into said basic compound in a horizontal pan mixer.

16. The method of claim 8, wherein the bast fibers are selected from the group consisting of hemp, flax, kenaf and nettle.

* * * * *